United States Patent [19]

Komurasaki et al.

[11] Patent Number: 4,967,710
[45] Date of Patent: Nov. 6, 1990

[54] KNOCK CONTROL APPARATUS FOR INTERNAL COMBUSTION ENGINES

[75] Inventors: Satoshi Komurasaki; Shoichi Kato; Hideki Umemoto, all of Hyogo, Japan

[73] Assignee: Mitsubishi Denki Kabushiki Kaisha, Tokyo, Japan

[21] Appl. No.: 422,716

[22] Filed: Oct. 17, 1989

[30] Foreign Application Priority Data

Oct. 18, 1988 [JP] Japan ................... 63-261934
Nov. 11, 1988 [JP] Japan ................... 63-283881

[51] Int. Cl.$^5$ .............................................. F02P 5/14
[52] U.S. Cl. ............................................... 123/425
[58] Field of Search ........................ 123/425, 435, 479

[56] References Cited

U.S. PATENT DOCUMENTS

| | | | |
|---|---|---|---|
| 4,377,999 | 3/1983 | Komurasaki et al. | 123/425 |
| 4,393,837 | 7/1983 | Sugihara et al. | 123/425 |
| 4,530,328 | 7/1985 | Komurasaki et al. | 123/425 |
| 4,606,316 | 8/1986 | Komurasaki | 123/425 |
| 4,607,602 | 8/1986 | Komurasaki et al. | 123/425 |
| 4,788,957 | 12/1988 | Komurasaki | 123/425 |
| 4,793,310 | 12/1988 | Komurasaki | 123/425 |

FOREIGN PATENT DOCUMENTS 0069026 5/1980 Japan ...................... 123/425

*Primary Examiner*—Willis R. Wolfe
*Attorney, Agent, or Firm*—Sughrue, Mion, Zinn, Macpeak and Seas

[57] ABSTRACT

A knock control apparatus of ignition timing control type according to the present invention comprises, as one aspect thereof, a knock control level increasing means for augmenting a knock phenomenon suppressing function, so that, when the knock interval is short, the output characteristic of the integrating means is increased to raise the control level for suppressing the knock generating element in each cylinder of the engine, and that the integrating means output characteristic is invalidated when the condition of the internal combustion engine reaches the normal operating state. The knock control apparatus comprises, as another aspect thereof, a reset pulse generation circuit for resetting the voltage from the above integrator to zero at the interval of more than a predetermined number of times the ignition cycle and in synchronism with the ignition signal.

12 Claims, 15 Drawing Sheets

→ TIME

→ TIME

→ TIME

RESET INTERVAL  RESET INTERVAL

TIME

FREQUENCY

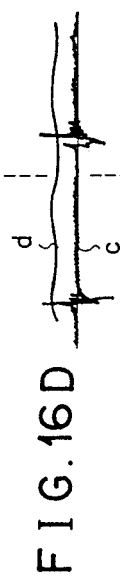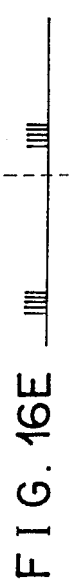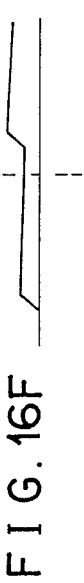
FIG.16A FIG.16B FIG.16C FIG.16D FIG.16E FIG.16F FIG.16G FIG.16H
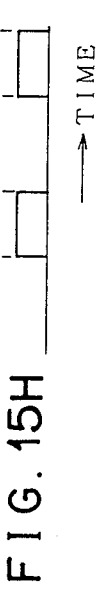
FIG.15A FIG.15B FIG.15C FIG.15D FIG.15E FIG.15F FIG.15G FIG.15H

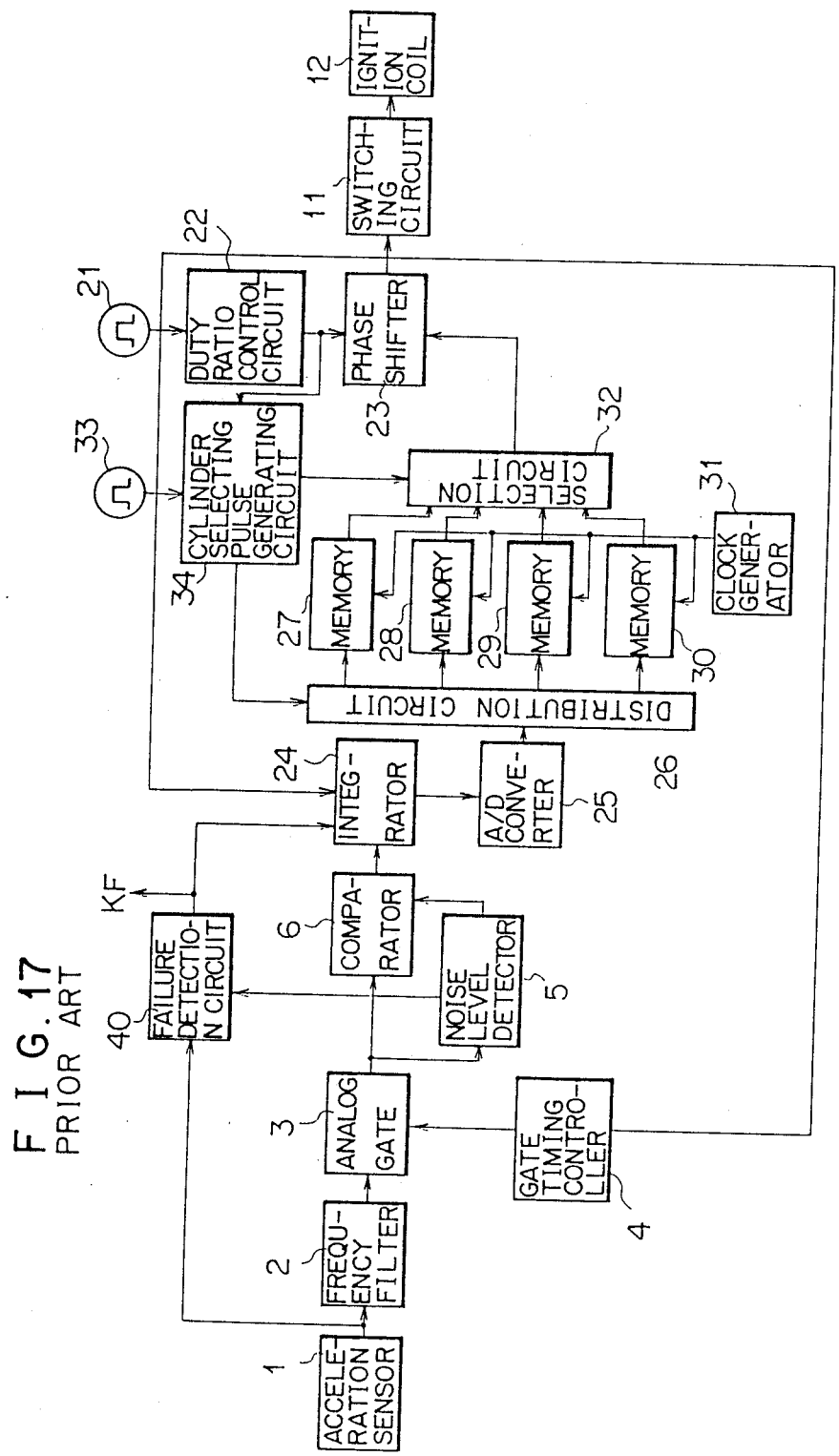

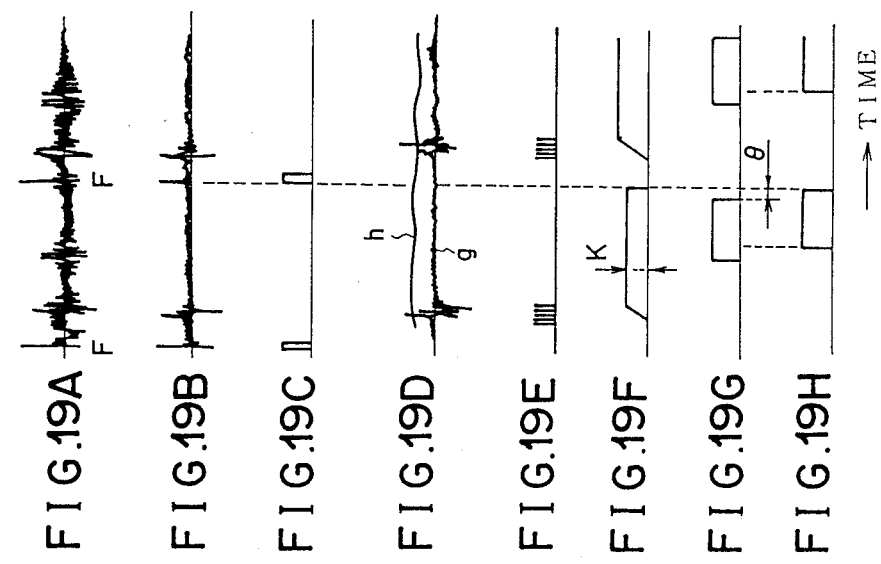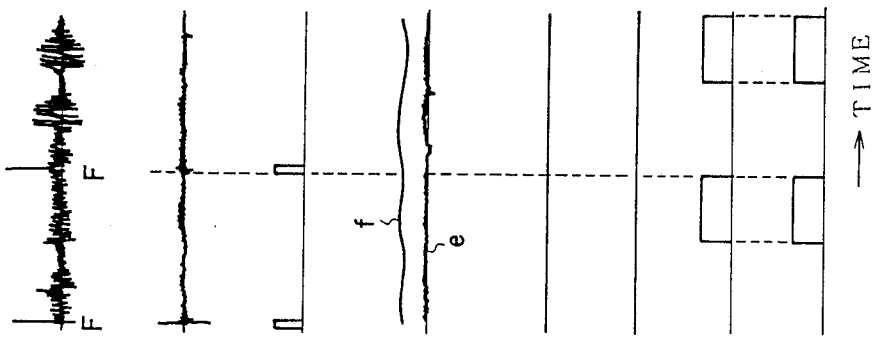

4,967,710

KNOCK CONTROL APPARATUS FOR INTERNAL COMBUSTION ENGINES

BACKGROUND OF THE INVENTION

1. Field of the Invention

This invention relates to a knock control apparatus for internal combustion engines, and more particularly to a knock suppression apparatus of ignition timing control type for improving the controllability of internal combustion engines during transient operation.

2. Description of the Prior Art

There are various types of control systems for detecting and suppressing knock phenomena occurring in internal combustion engines, such as fuel control systems, ignition timing control systems and pressure gate control systems. Here the ignition timing control system, which is the most frequently adopted system, will now be explained.

The following describes a knock control (ignition control) apparatus that utilizes the conventional ignition time control system for an internal combustion engine as shown in FIG. 13.

Such an ignition timing control type knock control apparatus is widely known. In the figure, reference numeral 1 designates an acceleration sensor that is attached to the engine to detect the vibration acceleration of the engine. Denoted 2 is a frequency filter that filters the output signal from the acceleration sensor 1 and passes a frequency component of the output signal which is typical of knocking. Designated 3 is an analog gate that eliminates noise from the output signal of the frequency filter 2 which is detrimental to detecting knocking. Reference number 4 indicates a gate timing controller that controls the opening and closing of the analog gate 3 according to the timing of noise occurrence. Denoted 5 is a noise level detector which detects the level of mechanical vibration noise from engine other than knocking. Designated 6 is a comparator that compares the output voltage of the analog gate 3 and the output voltage of the noise level detector 5, and generates a knock detection pulse. An integrator 7 integrates the output pulses from the comparator 6 and generates an integrated voltage according to the intensity of knocking. A phase shifter 8 changes the phase, i.e., the ignition timing of a reference ignition signal according to the output voltage of the integrator 7. A revolution signal generator 9 generates an ignition signal according to a preset ignition advance angle characteristic. A waveform shaper 10 shapes the output of the revolution signal generator 9 and at the same time performs the duty angle control for energization of an ignition coil 12. A switching circuit 11 switches on and off the electric current to the ignition coil 12 according to the output signal from the phase shifter 8, thus producing ignition pulses which are fed to the spark plug (not shown).

FIG. 14 shows the frequency characteristic of the output signal from the acceleration sensor 1. A represents the frequency characteristic when knocking is not present and B represents the frequency characteristic when knocking is present. The output signal of the acceleration sensor 1 contains, in addition to the knock signal (i.e., a signal generated by a knocking phenomenon), mechanical noise of engine and various other noise components such as ignition noise superimposed on the signal transmission paths. Comparison between the frequency curves A and B of FIG. 14 shows that the knock signal has a peculiar frequency distribution characteristic. That is, the presence of knocking is known to produce a clear distinction in the distribution characteristic although there are some variations in the curves depending on the type of internal combustion engine or on the position where the acceleration sensor 1 is mounted. By filtering the frequency components of the knock signal, it is possible to suppress noise of other frequency components than knocking and thereby efficiently detect the knock signal.

FIGS. 15 and 16 show the operation waveforms in each circuit of the conventional apparatus shown in FIG. 13. FIG. 15 represents the mode in which knocking is not present and FIG. 16 represents the mode in which knocking exists. Using FIGS. 15 and 16, we will explain the operation of the conventional apparatus shown in FIG. 13. As the engine runs, the revolution signal generator 9 produces an ignition signal according to the preset ignition timing characteristic. The ignition signal is shaped by the waveform shaper 10 into a pulse with a desired duty angle, which drives the switching circuit 11 through the phase shifter 8. The switching circuit 11 switches on and off the electric current to the ignition coil 12. When the electric current to the ignition coil 12 is interrupted, the coil induces an ignition voltage, which in turn fires the spark plug, initiating the combustion of air-fuel mixture in the engine cylinder. All engine vibrations that occur during operation of the engine are detected by the acceleration sensor 1.

When there is no knocking, engine vibrations due to knocking are not generated. But as there are always other mechanical vibrations, the output signal of the acceleration sensor 1 contains mechanical noise as well as ignition noise that is carried on the signal transmission path at time of ignition F, as shown in FIG. 15A.

The mechanical noise is substantially suppressed when the sensor signal is passed through the frequency filter 2, as shown in FIG. 15B. The ignition noise component, however, is large in magnitude compared with the mechanical noise component and thus may be output at high level after the sensor signal has passed through the frequency filter 2. With such an output waveform, the ignition noise may be mistaken for a knock signal. To prevent this, the analog gate 3 is closed at the instant of ignition for a predetermined period by the output of the gate timing controller 4 (FIG. 15C) which is triggered by the output of the phase shifter 8, in order to block the ignition noise which would otherwise be output from the frequency filter 2 to the comparator 6. Then, in the output of the analog gate 3 there remains only a low level of mechanical noise, represented by a of FIG. 15D.

The noise level detector 5 responds to changes in the peak value of the output signal from the analog gate 3 and generates a dc voltage slightly higher than peak value of the mechanical noise (b of FIG. 15D). The noise level detector 5 has a characteristic of being able to respond to relatively slow changes in the peak value of ordinary mechanical noise. Since, as shown in FIG. 15D, the output b of the noise level detector 5 is larger than the average peak value of the output signal a of the analog gate 3, the comparator 6 which compares these signals produces nothing as shown in FIG. 15E. Thus, noise signals other than the knocking signal are all eliminated.

The output voltage of the integrator 7 therefore remains zero as shown in FIG. 15F and the phase angle of the phase shifter 8 is also zero. The phase angle means the phase difference between the output of the wave shaper 10 (FIG. 15G) and the output of the phase shifter 8 (FIG. 15H). In other words, the open/close phase of the switching circuit 11 which is driven by the phase shifter output (FIG. 15H), i.e., the current interrupting phase of the ignition coil 12, is in phase with the reference ignition signal of the wave shaper output (FIG. 15G). The ignition timing is therefore equal to the reference ignition timing.

Next, when knocking occurs, the output of the acceleration sensor 1 contains a noise signal caused by knocking at a time a certain duration after the ignition timing, as shown in FIG. 16A. The signal that has passed through the frequency filter 2 and the analog gate 3 will have a large knock signal superimposed on the mechanical noise, as shown at c of FIG. 16D.

The leading edge of the knock signal that has passed through the analog gate 3 is very steep, so that the level change in the output voltage d of the noise level detector 5 (substantially equal to the voltage b of FIG. 15D) lags with respect to the knock signal. As a result, the inputs to the comparator 6 will be those represented by c and d of FIG. 16D and the comparator 6 produces its output pulses as shown in FIG. 16E.

The integrator 7 integrates the pulses entered and then generates an integrated voltage as shown in FIG. 16F. The phase shifter 8 retards the output signal of the waveform shaper 10 (FIG. 16G, i.e., reference ignition signal) according to the output voltage of the integrator 7, so that the output of the phase shifter 8 lags behind the reference ignition signal of the waveform shaper 10 and activates the switching circuit 11 at a phase shown in FIG. 16H. As a result, the ignition timing is retarded, suppressing knocking. In this way, the processing shown in FIGS. 15 and 16 is repeated to perform the optimum ignition timing control.

The conventional apparatus of FIG. 13 is constructed as described above. The rate of reduction in the output of the integrator 7, i.e., the speed at which the ignition timing is returned and advanced toward the reference, is represented by a large time constant, of the order of several seconds, per one degree of engine rotation. Thus, properly regulating the reduction rate is particularly important in preventing large knocking, which would occur when the ignition timing is returned toward the advance side at too high a speed, rapidly entering the knock region.

To optimumly control the speed of advancing the ignition timing by regulating the rate of reducing the integrator output, it is necessary to determine the accurate intensity of each knocking detected. To determine the knock intensity or magnitude from the output of the integrator 7 requires determining the integrator outputs immediately before and after the knock detection and calculating the difference between them, i.e., a change in the integrator output at each knock detection. This process requires complex calculation. The knock magnitude cannot be obtained by simply reading the value of the integrator 7 when knocking is detected. For example, the output of the integrator 7 before the knock occurs has to be stored in memory and, when knocking occurs, it is necessary to calculate the difference between the integrator outputs immediately before and after the knocking.

The engine control in recent years has become increasingly sophisticated and there is a trend toward employing a design in which precision control is performed for individual cylinders to keep the entire cylinders in an optimum state of combustion and thereby enhance engine output. To perform such a sophisticated control, it is necessary to detect the magnitude of each knocking as it occurs and also determine the magnitude of knock for each cylinder. However, to determine the magnitude of each knock from the output of the integrator 7 in the conventional apparatus requires complex calculation as mentioned above. And determining the magnitude of knock for each cylinder results in an increased size of the circuit. These are the problems with the conventional apparatus.

To solve these problems, a knock control apparatus was proposed which can easily detect the magnitude of each knocking as well as the magnitude of knock for each cylinder, and thereby make the knock control easy.

By referring to FIGS. 17 through 22, we will describe another conventional apparatus which realizes the above proposal. In FIG. 17, components 1 to 6 and 11 and 12 are identical with those of FIG. 13 with the same reference numbers and thus their description will be omitted. Denoted 21 is a cylinder pulse generator that generates a cylinder pulse corresponding to the ignition action of each cylinder in the engine. Designated 22 is a duty ratio control circuit that receives the cylinder pulse and generates a duty ratio-controlled ignition pulse to secure the sufficient energization time for the ignition coil 12. A phase shifter 23 performs the control of retarding the ignition pulse by an angle corresponding to the control voltage. An integrator 24 receives the knock pulse from the comparator 6 and outputs an integrated voltage proportional to the duration of the knock pulse. This integrator 24 is different from the integrator 7 used in the preceding conventional apparatus of FIG. 13 in that it maintains its output up to the ignition timing and resets the integrated voltage at each ignition according to the ignition pulse output from the phase shifter 23, rather than gradually reducing the integrated voltage with the elapse of time. Designated 25 is an A/D converter which converts the integrated voltage from the integrator 24 into a digital signal. 26 designates a distributor circuit which distributes the digital signal to the cylinder where knocking occurred. This embodiment represents a four-cylinder engine and the distributor circuit 26 in this embodiment therefore produces four outputs, equal in numbers to the cylinders. Denoted 27 to 30 are memories each of which corresponds to one of the four cylinders and stores digital signal from the distributor circuit 26. For instance, memory 27 stores the amount of knock that occurs in the first cylinder. A clock generator 31 produces pulses at predetermined intervals and supplies pulses to the memories 27-30 to perform subtraction on the values stored in them. A selector circuit 32 selects only the data from the memories 27-30 that relates to the fired cylinder. A reference pulse generator 33 generates a reference pulse for the reference cylinder—one of the four cylinders. Denoted 34 is a cylinder selection pulse generator circuit, which receives the reference pulse and the ignition pulse from the duty ratio control circuit 22 and generates cylinder selection pulses one after another to make the operation condition of the distributor circuit 26 and the selection circuit 32 to conform to the specified cylinder. A failure detection circuit 40 detects failures such as a broken signal wire between the acceleration sensor 1 and the frequency filter 2 or a ground fault. It also detects abnormal voltages at the output of the noise level detector 5 and enters a fail signal into the integrator 24. At the same time the failure detection circuit 40 sends fail signals KF to other fuel control apparatus and vehicle diagnostic apparatus.

FIGS. 18 and 19 show the operation waveforms of circuits shown in FIG. 17. The waveforms in these figures are identical with those of FIGS. 15 and 16 that represent the conventional apparatus if they are assigned like reference numerals.

The fundamental operation will be explained by referring to FIGS. 18 and 19. When the engine is not producing knocking, the two inputs to the comparator 6 will be as shown in FIG. 18D. Since there is no knock signal at e in FIG. 18D, no pulse will be produced at the output of the comparator 6 as shown in FIG. 18E. Thus, no pulse is produced at the output of the integrator 24 (FIG. 18F). Therefore, memories 27-30 contain no values and the selection circuit 32 has no output, so that there is no phase difference between the input (FIG. 18G) and the output (FIG. 18H) of the phase shifter 23, leaving the ignition timing at the reference position.

Next, the operation performed when knocking occurs in the engine will be described by referring to FIG. 19. The two inputs to the comparator 6 will be as shown in FIG. 19D and since a knock signal appears at g in FIG. 19D, the comparator 6 produces a knock pulse as shown in FIG. 19E. The knock pulse is integrated by the integrator 24. To perform knock detection for each cylinder, the output of the integrator 24 is reset by the output of the phase shifter 23 each time the cylinders are ignited. For this reason, during the time from the knock detection to the resetting, the output of the integrator 24 is kept at a constant value. These operations are performed at each ignition interval. This is where this conventional embodiment differs from the preceding conventional apparatus of FIG. 13. The output of the integrator 24 (integrated voltage) is converted into digital signals by the A/D converter 25. The distributor circuit 26 identifies the cylinder where knocking occurred, according to the cylinder selection pulse from the cylinder selection pulse generator 34. When, for example, the cylinder where knocking occurred is the third cylinder, the distributor circuit 26 then inputs the digitized integrated voltage from the A/D converter 25 into memory 29 associated with that cylinder. The memory 29 then stores the integrated voltage fed from the distributor circuit 26. According to the cylinder selection pulse from the cylinder selection pulse generator 34, the selection circuit 32 selects the memory 29 that corresponds to the third cylinder, and transfers the output of the memory to the phase shifter 23. Here we are dealing with the case where knocking occurred in the third cylinder, so when the third cylinder is fired, the output of memory 29 is chosen and entered into the phase shifter 23. In FIG. 19, knocking also occurred in the next cylinder, so that in an ordinary 4-cylinder engine, knocking is determined to have occurred in the fourth cylinder. In this case, the output of the integrator 24 is picked up by the distributor circuit 26 which stores it in memory 30. Then the selection circuit 32 selects the memory 30 and transfers its output to the phase shifter 23 when the fourth cylinder is ignited.

Now, the control for individual cylinders will be described in detail by referring to waveforms in FIG. 20. In the figure, (s) represents the ignited cylinder number; (e) the output of the comparator 6; (f) the output of the comparator 24; (j), (k), (l) and (m) the stored values in memories 27-30; (p) the output of the selection circuit 32; and (g) and (h) the input and output of the phase shifter.

As shown in FIG. 20(e), there are knock pulses at the output of the comparator and knocking occurs in the order of third, second, third, fourth and second cylinder. These knock pulses are converted by the integrator 24 into the integrated voltage, which is output as shown in FIG. 20(f). K1, K2, K3, and K5 represent the levels of knocking detected, with the magnitude gradually increasing up to K5, which is the largest. At time t1, knocking occurs in the third cylinder and the output of the integrator 24 reaches the voltage K5. The voltage K5 is converted by the A/D converter 25 into a digital signal, which is then entered into the distributor circuit 26. The distributor circuit 26 selectively outputs the digitized integrated voltage K5 to the memory 29 at the ignition timing t2 of the fourth cylinder. As a result, the digitized integrated voltage K5 is memorized in the memory 29 at time t2, so that the value contained in the memory 29 becomes the voltage K5 (FIG. 20(l)). Next, at time t3, knocking occurs in the second cylinder and the knock pulse is integrated by the integrator 24 into the integrated voltage K5, which is converted into a digital signal by the A/D converter 25. The digitized integrated voltage K5 is selectively input to the memory 28 by the distributor circuit 26 and, at time t4, is stored in the memory 28 (FIG. 20(k)). Time t4 is an ignition timing for the first cylinder and from this point onward the third cylinder enters the ignition control sequence. At this time since the voltage K5 is already stored in memory 29, the selection circuit 32 outputs the voltage K5 (FIG. 20(p)) to the phase shifter 23. Then the phase shifter 23 retards the next ignition timing by an angle $\theta 5$ corresponding to the voltage K5, the angle $\theta 5$ being equal to a phase delay of the output of the phase shifter 23 (FIG. 20(h)) relative to its input (FIG. 20(g)). As a result the next ignition occurs at time t5. Although the ignition is retarded from the reference ignition timing by $\theta 5$ and performed at time t5, knocking occurs again at time t6 in the third cylinder. This knocking has the level of K2 and the corresponding integrated voltage K2 is entered into memory 29 at the next ignition timing (time t7) of the fourth cylinder. At this time the memory 29 already contains the voltage K5, so that the voltage K2 is added to the voltage K5 and a new voltage K7 is memorized instead (FIG. 20 (l)). For the ignition at time t7 (reference ignition timing), knocking occurs at time t8 in the fourth cylinder and the integrated voltage K3 is output. The voltage K3 is stored in memory 30 at the next ignition timing (time t9) of the second cylinder.

From time t7 the next ignition control sequence for the second cylinder is started. At this time, the voltage K5 is already stored in memory 28 and the selection circuit 32 selectively inputs the voltage K5 to the phase shifter 23. As a result, the next ignition timing will be t9, which is $\theta 5$ retarded from the reference, $\theta 5$ corresponding to the voltage K5. For the ignition at time t9, knocking occurs at time t10 in the second cylinder, causing the integrated voltage K1 to be output. The voltage K1 is added to memory 28 at time t11 of the next ignition timing, with the result that the contents of the memory 28 will be voltage K6. From time t11 the ignition control sequence for the third cylinder starts. At this time, the memory 29 contains the voltage K7, so that the next ignition timing t12 will be $\theta 7$ retarded from the reference. In this way, the similar ignition point retarding control is repeated and the next ignition timing (t13) for the fourth cylinder will be θ3 retarded from the reference. And the next ignition timing (t14) for the second cylinder will be lagging by θ6 from the reference.

As described above, the ignition timing is retarded in accordance with the magnitude of knocking detected (integrated voltage). When knocking no longer occurs in the engine, the ignition timing must be advanced toward the reference at the specified rate to come close to the knock limit. In this embodiment, the values stored in the memories 27-30 are subtracted by the clock of the clock generator 31 at the specified rate to make the stored values smaller, reducing the voltage to be input to the phase shifter 23 and therefore the retarding angle, so that the ignition timing will come close to the reference.

If the components in this embodiment—such as the phase shifter 23, a group of components from the integrator 24 to selection circuit 32, and the cylinder selection pulse generator circuit 34—are constructed using computer, it is possible to develop a sophisticated control system that permits precision control including engine fuel control.

Furthermore, as with the conventional apparatus of FIG. 13, it is possible to retard the ignition timings for all cylinders by the same angles. In this case, the distribution circuit 26 and the selection circuit 32 for selecting the cylinder are fixed, and only one of the four memories 27-30 need be used. It is also possible to switch between the individual cylinder control and the all-cylinder control depending on circumstances.

The failure detection circuit 40 outputs a fail signal KF when a signal wire connecting the acceleration sensor 1 and the frequency filter 2 is broken, when a ground fault occurs or when the output of the acceleration sensor 1 is not normally entered into the frequency filter. Of these failures, in general, break of the signal wire is most likely to occur (for example, poor contact in the connector). The failure detection circuit 40 also produces a fail signal KF when the operating condition of the noise level detector 5 becomes abnormal. In other words, this circuit 40 detects when the operation deviates from the normal setting range even though the signal wire between the acceleration sensor 1 and the frequency filter 2 is normal. For example, the signal to be processed may become very large making it impossible to output the normal comparison reference voltage. The integrator 24, when it receives the fail signal KF from the failure detection circuit 40, is activated irrespective of the signal from the comparator and outputs the integrated voltage at time of failure. FIGS. 21 and 22 show one example of integrated voltage in the event of failure. In the case of FIG. 21, the integrator 24 always outputs the maximum possible integrated voltage VoMAX. The maximum integrated voltage VoMAX is repetitively reset at the ignition timing (at time F) by the ignition signal output from the phase shifter 23 so that it will become zero each time ignition occurs. In the case of FIG. 22, the integrator 24 is not reset by the ignition signal from the phase shifter 23. This is accomplished by nullifying the ignition signal fed to the integrator 24 by the fail signal KF from the failure detection circuit 40. Since the integrated voltage VoMAX is output at all times, it is stored in all memories 27-30. Thus the ignition timing is automatically set to the desired time which will not produce knocking when some failure occurs. In this example, the ignition timing is controlled by using the maximum value VoMAX of the output of the integrator 24 in the event of failure. It is noted that the control variable may be other than the maximum value and may be an intermediate value. It is also possible to include in this control variable the engine knock characteristic and other characteristics. The fail signal KF may be supplied to a fuel control apparatus to achieve the overall control of an engine. Or it may be entered into a diagnostic apparatus to set off an alarm. It is also possible to include other control equipment to develop a more comprehensive control system.

The conventional knock suppression apparatus is constructed as described above and thus can control the knock value below a desired level (normally smaller than a so-called trace knock). However, during the transient operating condition, as when the engine is accelerating, there are varying operating conditions among various parts of the engine due to their differing transient characteristics. For this reason, knocking occurs more frequently than during the steady state operating condition. Therefore, the control characteristic which suppresses knocking during the steady state operation down to trace knock is not sufficient for the knocking that occurs during transient condition. In other words, the controllability during transient condition is not good. That is, the conventional apparatus has the drawback that the knocking during transient operating condition is greater in magnitude and trace knocks occur more frequently than during the steady state condition, causing unpleasant noise.

In the above-mentioned conventional knock control apparatus, the integrator 24 is reset by the ignition signal output from the phase shifter 23 so that the integrated voltage—an output of the integrator 24—becomes zero at each ignition timing. When this resetting, necessary to read the magnitude of knocking at each ignition (each time knocking occurs), is repeated for every ignition as in the conventional apparatus of FIG. 17, the detection of knock itself may be affected and in the worst case cannot be done at all depending on the setting value of the reset time.

In other words, in the system where the reset time is set with a constant-time pulse, which is easily dealt with, the above-mentioned problem arises when the engine runs in the high revolution speed zone in which the ignition cycle is short. That is, if the reset time is constant, the reset time—which is converted into the rotating angle of the engine—becomes relatively large as the revolution speed of the engine increases and the reset time may encompass the area where knocking occurs after ignition. In high rotating speed regions where the cycle is short, the reset time thus set may cover the knocking region.

If the reset time is set with a constant angle, whose processing is complex, the reset time will not encompass the knocking region regardless of the revolution speed of the engine. However, the reset time (absolute time) becomes short in the high revolution region, which gives rise to the possibility that the integrated voltage in the integrator 24 cannot reliably be reset to zero.

Therefore, a primary object of the invention is to provide a knock control apparatus which can suppress knocking that occurs during transient operating condition of the engine down to a suppression level equal to the one during the steady state operation and which can prevent knocking over a long period of time.

A second object of the invention is to provide an ignition timing control apparatus for internal combustion engines which makes use of the knock occurring mechanism (i.e., during the normal operating condition of the engine the interval of knocking is, on average, of the order of several seconds and knocks occur a specified number of ignition periods apart); which sets the reset period longer than the ignition cycle; and which permits resetting that is virtually the same as the above-mentioned reset processing.

A means to achieve the first objective makes the control quantity for suppressing the knock detected larger during the transient operating condition than during the steady state operation so as to suppress knocking during the transient operation below a level of trace knock thus improving the transient operation responsiveness of the system.

A means to achieve the second objective provides a reset generation circuit to generate a reset pulse that resets the integrated voltage of the integrator to zero in synchronism with the ignition signal at intervals of more than double the ignition cycle.

SUMMARY OF THE INVENTION

To achieve the above objectives, this invention adds a new function to the conventional apparatus. That is, in an apparatus which comprises: a knock sensor to detect knock information in the engine; a knock discriminator to identify from the knock sensor output the knocking that occurs in each engine cylinder; an integrator which produces an integrated voltage according to the knock discriminator output and resets the integrated voltage to zero in response to the ignition action; an accumulator that accumulates the integrated voltage; a phase shifter which phase-controls the ignition signal according to the accumulator output; and a switching circuit that interrupts electric current to the ignition coil in response to the phase shifter output; a control quantity increasing function is added, which determines from the knock intervals whether the knocks are steady-state knocks or transient knocks that occur during the transient operating condition of the engine and which increases the control quantity according to the detected knock level, thereby suppressing the transient knocks, which occur at short intervals and produce unpleasant noise, down to a suppression level almost equal to the one during the steady-state operation. Or to achieve the second objective, the invention is characterized by the addition of a reset pulse generation circuit, which, according to the phase shifter output, resets the integrated voltage to zero in synchronism with the ignition signal at intervals of more than a specified number of times the ignition period so as to permit the integrated voltage to be reset at intervals greater than those used in the conventional apparatuses, with the result that even during high revolution operation of the engine the reset time will not adversely affect the detection of knocking, making it possible to detect knocking as reliably as during the low revolution operation.

BRIEF DESCRIPTION OF THE DRAWINGS

The purpose and advantages of the present invention will be apparent to those skilled in the art from the following detailed description in conjunction with the accompanying drawings, in which:

FIGS. 15A-15H and FIGS. 16A-16H are operation waveform diagrams for the conventional apparatus;

FIG. 17 is a block diagram of another example of conventional apparatus;

FIGS. 18A-18H and FIGS. 19A-19H are operation waveform diagrams for the conventional apparatus of FIG. 17;

DETAILED DESCRIPTION OF THE PREFERRED EMBODIMENTS

Since the ultimate objective of this invention is to effectively control knocking during operation of internal combustion engines whether it is during transient or steady state operation, we will explain the general concept of knocking and embodiments for controlling the knocks.

A first embodiment described in the following provides a knock control apparatus which suppresses knocking during the transient operating condition of the engine down to the suppression level equal to the one during the steady state operation and which is capable of preventing knocking for a long period of time.

Knocking that occurs in the internal combustion engine during the steady state operation where the engine is running under the fixed conditions, occurs at intervals of more than several seconds (the level of knocking being suppressed to that of trace knock by the control action). It was found from tests that this characteristic is almost not affected by the revolution speed or load of the engine. On the other hand, for the knocks that occur during the transient operating condition, the control amount is insufficient at first because of the fundamental characteristic (responsiveness) of the feedback control, resulting in knocks being greater than the trace knock. As the control amount becomes large enough for each knocking, the knocks are then suppressed to the level of trace knock. The knocking interval during the transient condition is less than 0.1 second, much shorter than that of steady state operation, i.e., it occurs more frequently, so that trace knocks are produced for a long period of time, causing unpleasant noise, deteriorating controllability. These are verified by tests. Utilizing such engine characteristics that were confirmed with the tests, the apparatus of this invention checks the knock intervals to determine whether the engine is running in the steady state or the transient state and thereby increase the control quantity when the engine is found to be running in the transient condition.

Figure 1A:
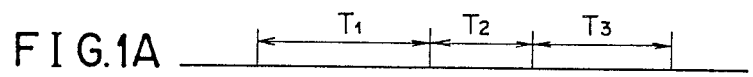
FIG. 1A and 1B represent knock interval characteristic diagrams for internal combustion engines employing the knock control apparatus as one embodiment of this invention.
Figure 1B:
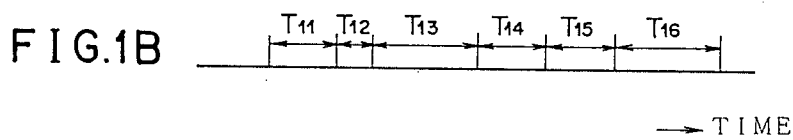

The knocking interval characteristics during the steady state and during the transient state are shown in FIG. 1 with abscissa representing time. FIG. 1A shows knocks that occurred during the steady state operation and it is seen that while the knock intervals $T_1$, $T_2$ and $T_3$ are different from each other, they all assume long periods of time, more than several seconds. On the other hand, FIG. 1B shows the knocks that occurred during the transient condition and it is seen that the knock intervals $T_{11}$ to $T_{16}$ are each less than 0.1 second, far shorter than the knock intervals $T_1$-$T_3$ for the steady state operation of FIG. 1A.

Figure 2:
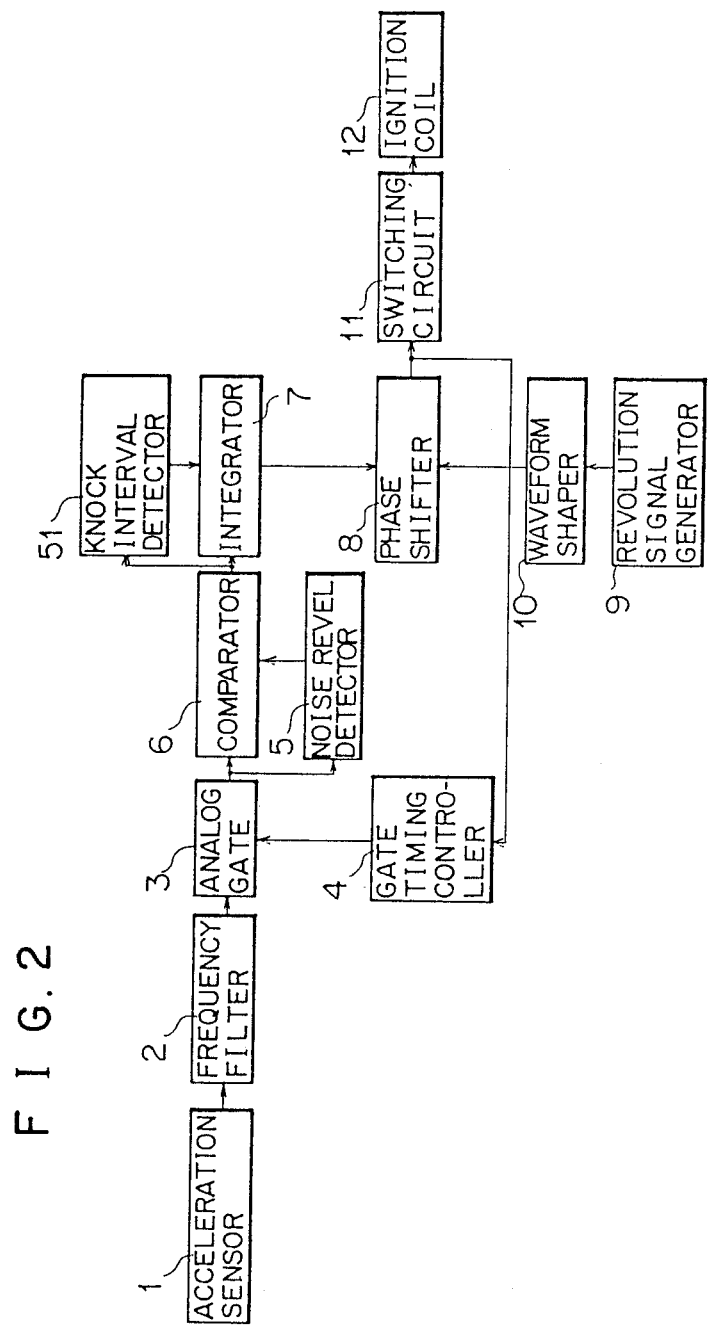
FIG. 2 is a block diagram of a first embodiment of the invention.
Figure 13:
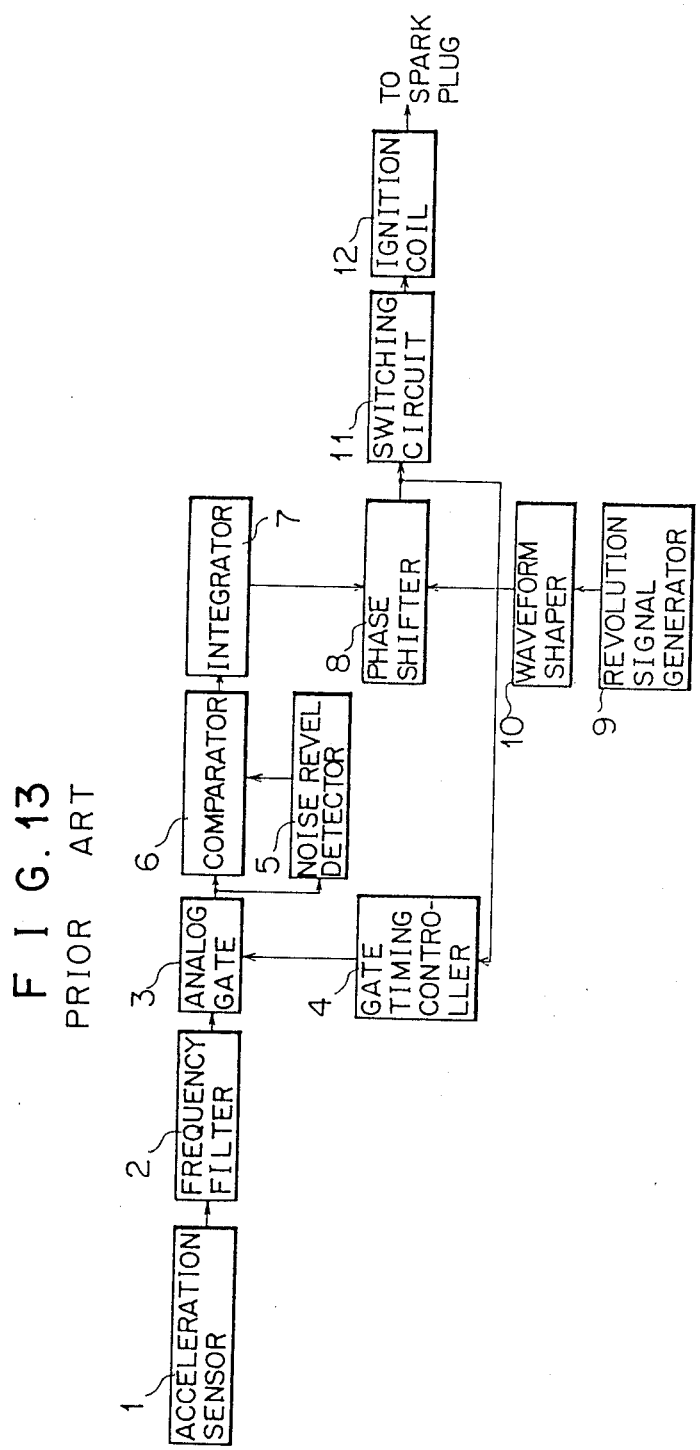
FIG. 13 is a block diagram of the conventional apparatus.
Figure 20:
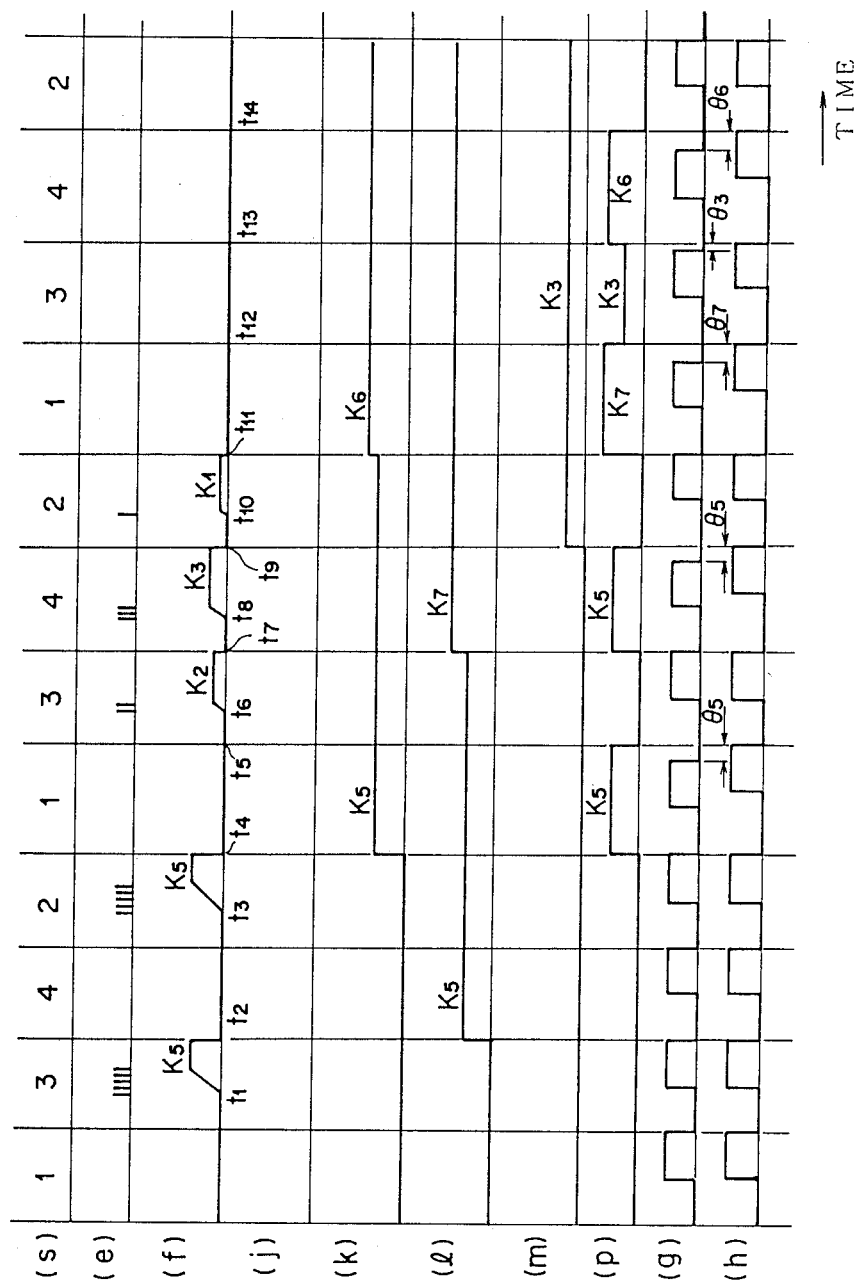
FIG. 20 is operation waveform diagrams for individual cylinders.

Next, we will explain embodiments of this invention. FIG. 2 is an embodiment which has made some modifications to the conventional apparatus of FIG. 13. That is, from the output (knock pulse) of the comparator 6 the knock interval is detected. When the knock interval is short, control is performed in a direction that increases the output characteristic of the integrator 7 that integrates the knock pulse. In FIG. 2, reference numerals 1 to 12 represent components identical with those of FIG. 13 with like reference numbers and their explanation will not be given. Denoted 51 is a knock interval detector which detects the intervals of knock pulses output from the comparator 6 and determines, for instance, that the engine is in the transient condition when the knock pulses appear at intervals of less than 0.1 second. When the engine is running in the transient condition, the knocks appear at short intervals of less than 0.1 second as shown in FIG. 1B and the knock interval detector 51 decides that the transient knocks are being produced and performs control in such a way as to increase the output of the integrator 7 that integrates the knock pulse from the integrator 6.

Figure 3A:
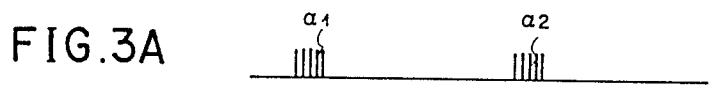
FIG. 3A and 3B are diagrams showing the operation of FIG. 2.
Figure 3B:
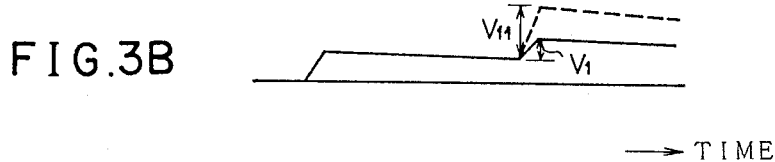

Now, the operation will be explained by referring to FIG. 3. FIG. 3A shows knock pulses output from the comparator 6, and FIG. 3B shows the output of the integrator 7. As shown in FIG. 3A, a second knock $\alpha_2$ follows a first knock $\alpha$hd 1 within 0.1 second. So, the knock interval detector 51 decides, when the second knock $\alpha_2$ appears, that these are transient knocks and controls the characteristic of the integrator 7 accordingly. That is, in the steady state operation in which the knock interval is long and more than several seconds, the output of the integrator for the second knock $\alpha_2$ is $V_1$ (FIG. 3B). For the transient knock $\alpha_2$, the integrator 7 produces an output $V_{11}$ (the broken line of FIG. 3B) larger than $V_1$. The output of the integrator 7 corresponds to the phase shifting angle of the phase shifter 8, so that the phase shifting control (retarding control) to retard the ignition point by the angle corresponding to the output $V_{11}$ will be performed. As a result, the ignition point is retarded with good responsiveness in accordance with the frequency of knocking that occurs in large numbers in a short period during the transient operation.

In the above embodiment the output characteristic of the integrator 7 is controlled. Next, we will describe another embodiment by referring to FIG. 4, in which the knock control is done by adding a fixed mount to the output of the integrator 7. In the figure reference numbers 1 to 12 represent components identical with those of FIG. 13 and FIG. 2 with like reference numbers and their explanation will not be given. Denoted 52 is a knock interval detector that detects the interval at which the pulses are produced by the comparator 6. Designated 53 is a pulse generator that receives the output from the detector 52 and generates pulses to activate the integrator for a specified period of time.

Figure 5A:
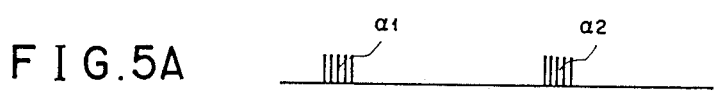
FIG. 5A and 5B are diagrams showing the operation of FIG. 4.
Figure 5B:
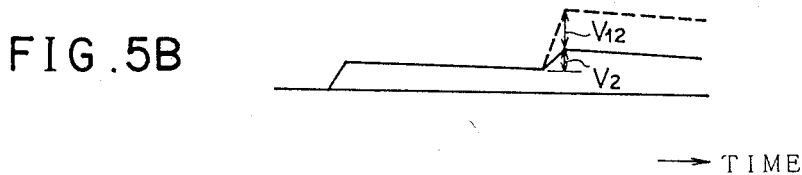
Figure 4:
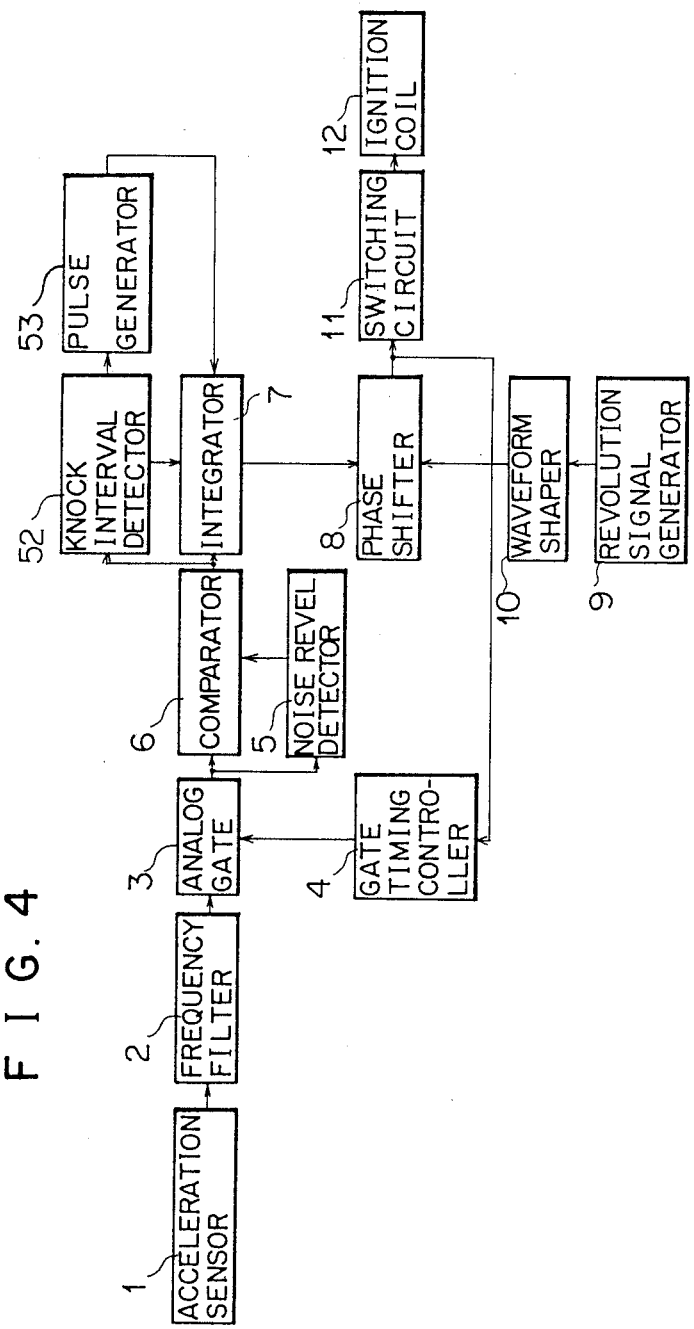
FIG. 4 is a block diagram of another embodiment of the invention.

FIG. 5 shows the output of the comparator 6 of FIG. 4 (FIG. 5A) and the output of the integrator 7 (FIG. 5B). When as shown in FIG. 5E a second knock $\alpha_2$ occurs within 0.1 second after the preceding knock $\alpha_1$, the knock interval detector 52 determines that these knocks $\alpha_1$, $\alpha_2$ are transient knocks and produces a corresponding output. Upon receiving the output from the knock interval detector 52, the pulse generator 53 supplies a specified-width pulse to the integrator 7. The integrator 7 responds to the pulse from the comparator 6 and also to the pulse from the pulse generator 53, and produces a combined voltage as shown in FIG. 5B. That is, in FIG. 5F the pulse indicated by a solid line represents an output corresponding to the pulse from the comparator 6 and the pulse shown by a broken line represents an output corresponding to the pulse from the pulse generator 53. In other words, the increment $V_2$ in the output of the integrator 7 at time of the second knock $\alpha_2$ corresponds to the pulse from the comparator 6, and the increment $V_{12}$ corresponds to the pulse from the pulse generator 53. Since the output $V_2$ corresponds to the pulse from the comparator 6, its characteristic is identical with that of the conventional apparatus shown in FIG. 16F.

With the above embodiment it is possible to suppress the transient knocks, which occur in large numbers in a short period during transient operation of the engine, below the trace knock, which is equivalent to the suppression level for the steady state operation, thus eliminating unpleasant noise caused by the transient knocks. This embodiment assures a good controllability.

Knocking that occurs in the engine depends on many factors such as gasoline octane value, temperature and humidity of intake air, water temperature, revolution speed and load. Therefore, the values such as $V_{11}$ relative to $V_1$ shown in FIG. 3 and $V_{12}$ shown in FIG. 5 can be controlled with improved accuracy by using various kinds of information on knocking.

Figure 6:
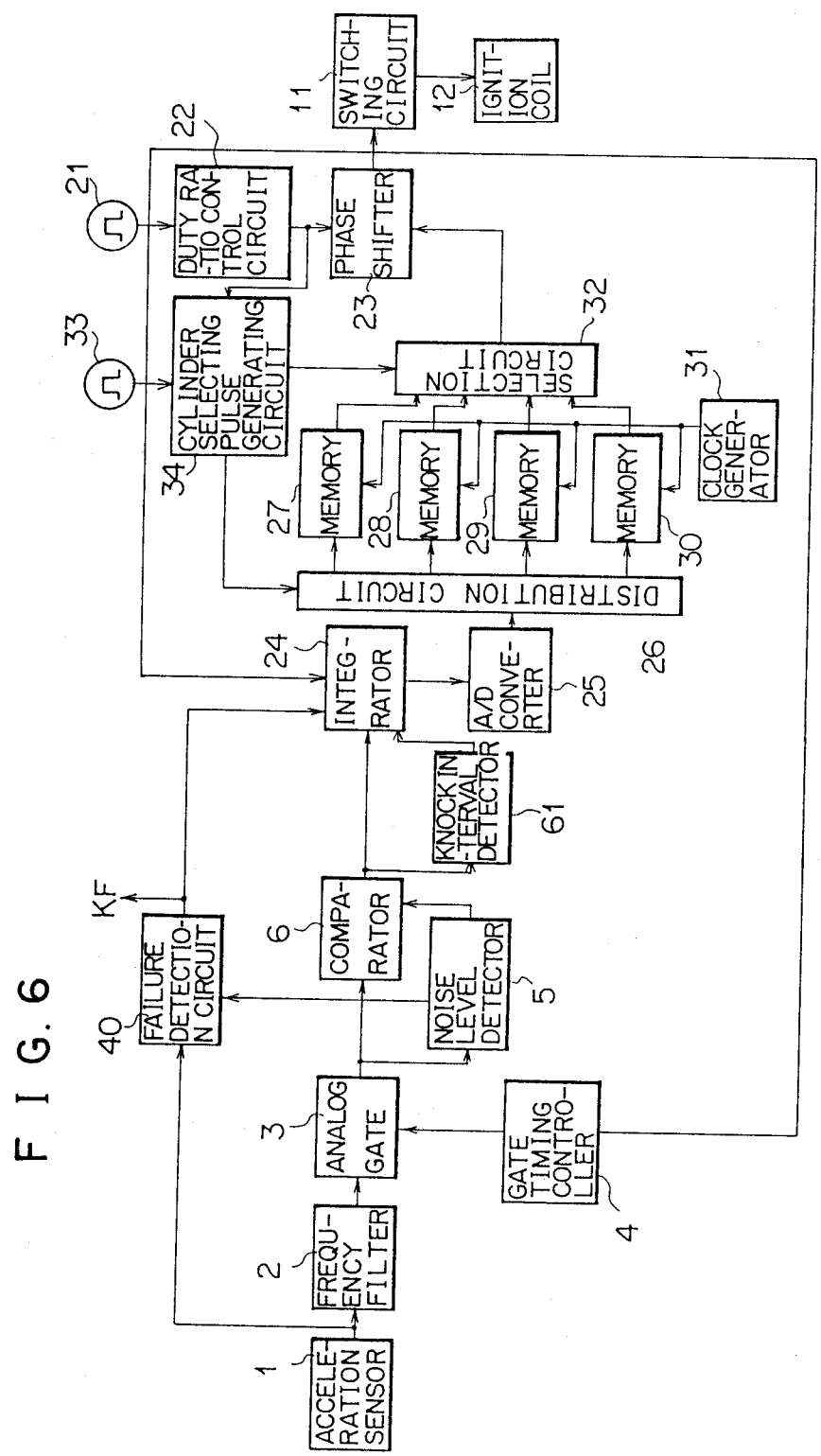
FIG. 6 is a block diagram of another embodiment of the invention.

Next, we will explain another embodiment of this invention shown in FIG. 6 as applied to the conventional apparatus of FIG. 17, which was described in the foregoing as a system suited for detecting the level of each knocking.

In FIG. 6, reference numerals 1-6, 11, 12, 21-34, and 40 represent components identical with those of FIG. 17 with like reference numbers and their explanation will be omitted. Denoted 61 is a knock interval detector that detects the occurrence of transient knocks from the interval of pulses output from the comparator 6.

The knock interval detector 61 checks the interval between pulses output from the comparator 6 and when the knock interval is less than 0.1 second, the detector 61 determines that the engine is in the transient condition and that transient knocks are being produced. When it detects the transient knocks, the knock interval detector 61 changes its response to the comparator knock pulse to increase the output of the integrator 24 (retard-controlled voltage) so that the output of the integrator 24 will become larger than that during the steady state operation. It is possible to further change the response characteristic and thereby change the increment of the integrator output.

In this case, the knock level is checked and controlled for each knocking cylinder each time the knock occurs. When transient knocks occur as described above, the transient knock control is performed only on the knocking cylinders successively according to the detected knock level.

Figure 7:
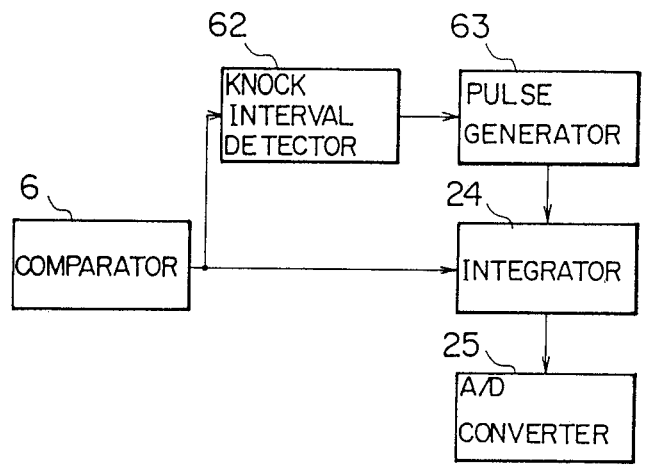
FIGS. 7 and 8 are block diagrams showing the essential portion of other embodiments according to the invention.

Next, a further embodiment will be explained by referring to FIG. 7. FIG. 7 shows only those components of the conventional apparatus of FIG. 17 associated with this invention. Reference numbers 6, 24 and 25 represent components identical with those of FIG. 17 with like reference numbers. Their explanation will not be given.

In FIG. 7, a knock interval detector 62 detects transient knocks from the interval of pulses output from the comparator 6. A pulse generator 63 produces pulses of a specified width according to the output of the transient knock interval detector 62.

When the interval of pulses output from the comparator 6 is less than 0.1 second, the knock interval detector 62 detects the occurrence of transient knocks and issues a corresponding output. Upon receiving the signal from the knock interval detector 62, the pulse generator 63 produces a pulse of a specified width and sends it to the integrator 24, which increases its output according to the transient knock. As in the case of FIG. 6, for each knocking cylinder, the transient knock control is carried out successively each time knocking occurs.

It is readily possible to change the pulse width generated by the pulse generator 63 and thereby increase the output of the integrator 24.

Figure 8:
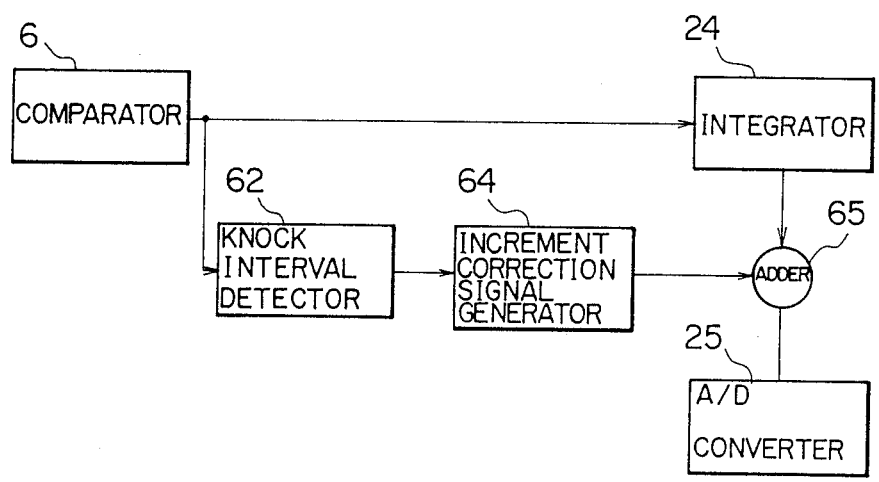

FIG. 8 shows, as with FIG. 7, only those components associated with this invention. Components 6, 24, 25 are identical with those of FIG. 7 with like reference numbers. Denoted 64 is an increment correction signal generator which produces an analog quantity for transient increment correction according to the output of the knock interval detector 62. Designated 65 is an adder that adds the output of the integrator 24 and the analog quantity from the increment correction signal generator 64.

Each time the transient knock is detected, the knock interval detector 62 produces an output, in response to which the increment correction signal generator 64 outputs a specified analog quantity as the increment correction signal.

The adder 65 performs addition on the analog signals from the integrator 24 and the increment correction signal generator 64 and outputs the result. When the transient knock is detected, the increment correction signal is added to the output of the integrator 24 to perform the increment control by a specified amount. In this case also, it is readily possible to change the increment value output from the increment correction signal generator 64, permitting a more accurate control.

While the above embodiments use analog quantities for increment correction, digital quantities (digital signals) may also be used. The increment control using digital quantities will be described by referring to FIG. 9.

Figure 9:
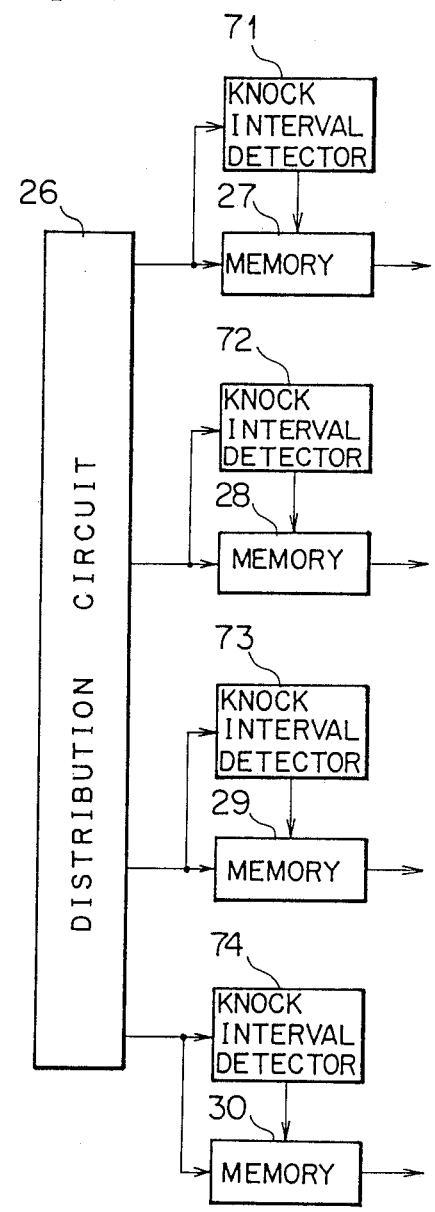
FIG. 9 is a block diagram of a further embodiment which performs the quantity increase processing on the digital quantity.

FIG. 9 shows the A/D converter 25 and memories 21-30, to which the embodiment of this invention applies. The clock generator 31 connected to the memories 27-30 is not shown. Denoted 71 to 74 are knock interval detectors that correspond to the memories 27 to 30. According to the interval of digital control signals output from the distributor circuit 26 for each cylinder, these knock interval detectors 71-74 detect transient knocks for each cylinder and supplies digital increment signals to individual memories 27-30.

In the preceding embodiments, the transient knocks are detected only from the interval of knocks. In addition to the knock interval, it is possible to include the magnitude of knock in the knock control. That is, when knocks greater in magnitude than a specified level occur at intervals less than 0.1 second, it is determined that these knocks are the transient knocks and the corresponding increment correction control is carried out. This method can easily be applied to any of the preceding embodiments.

If the increment is made to increase as the knock interval shortens, the control becomes more accurate and effective in suppressing the knocks. In the case of the embodiment of FIG. 2 where the integrator characteristic is controlled, this method can be accomplished by increasing $V_{11}$ of FIG. 3 as the interval of pulses fed from the comparator 6 becomes shorter. In the case of FIG. 4 where the correction quantity is added to the integrator output, $V_{12}$ of FIG. 5 need be increased as the interval of pulses from the comparator 6 becomes short.

As mentioned above, because of the increment correction control for the transient knocks, the retard angle control quantity becomes larger than during the steady state operation. If, however, during the steady state operation after the transient knocks occurred, the increased retard angle control quantity still remains, the fuel economy and drive feeling may deteriorate. It therefore desired to nullify, during the steady state operation that follows, the increased control quantity for the transient knocks or to return or advance the ignition timing toward the reference to an extent that will cause no adverse effects. This control will assure a more desirable operating conditions.

In summary, in order to achieve the first object of this invention, an increment control function is added to the conventional knock control apparatus for internal combustion engines which detects knocking in the engine and, according to the magnitude of knocking detected, controls the knock causing element to suppress that knocking. The added increment control function is to determine, from the knock interval, whether the knocks that have occurred are steady state knocks or transient knocks and performs the increment control on the detected knock level. The detection of knock interval, which is simple and easy, makes it possible to suppress with good responsiveness the transient knocks—which occur at short intervals and cause unpleasant noise—down to a suppression level as low as the trace knocks that occur during the steady state operation, the trace knocks being not unpleasant to human ears.

Next, we will describe another embodiment that achieves the second object of the invention. That is this embodiment provides an ignition timing control apparatus for internal combustion engines which, by making use of the knock generation characteristic, makes the reset period longer than the ignition period so that the resetting virtually the same as the aforementioned resetting processing (i.e., a processing to reset the integrated voltage to zero in each ignition cycle) can be done.

Normally, knock levels to be controlled are very small and generally called trace knocks. The frequency at which the trace knocks occur is also small, that is, they occur not so often as the ignition cycle. The trace knocks usually occur on average at the intervals of the order of several seconds and appear a specified number of ignition periods apart. Thus, resetting the integrator in each ignition cycle is not necessary. Taking note of this fact, this invention makes the cycle of resetting the integrator longer than the ignition cycle.

Figure 10:
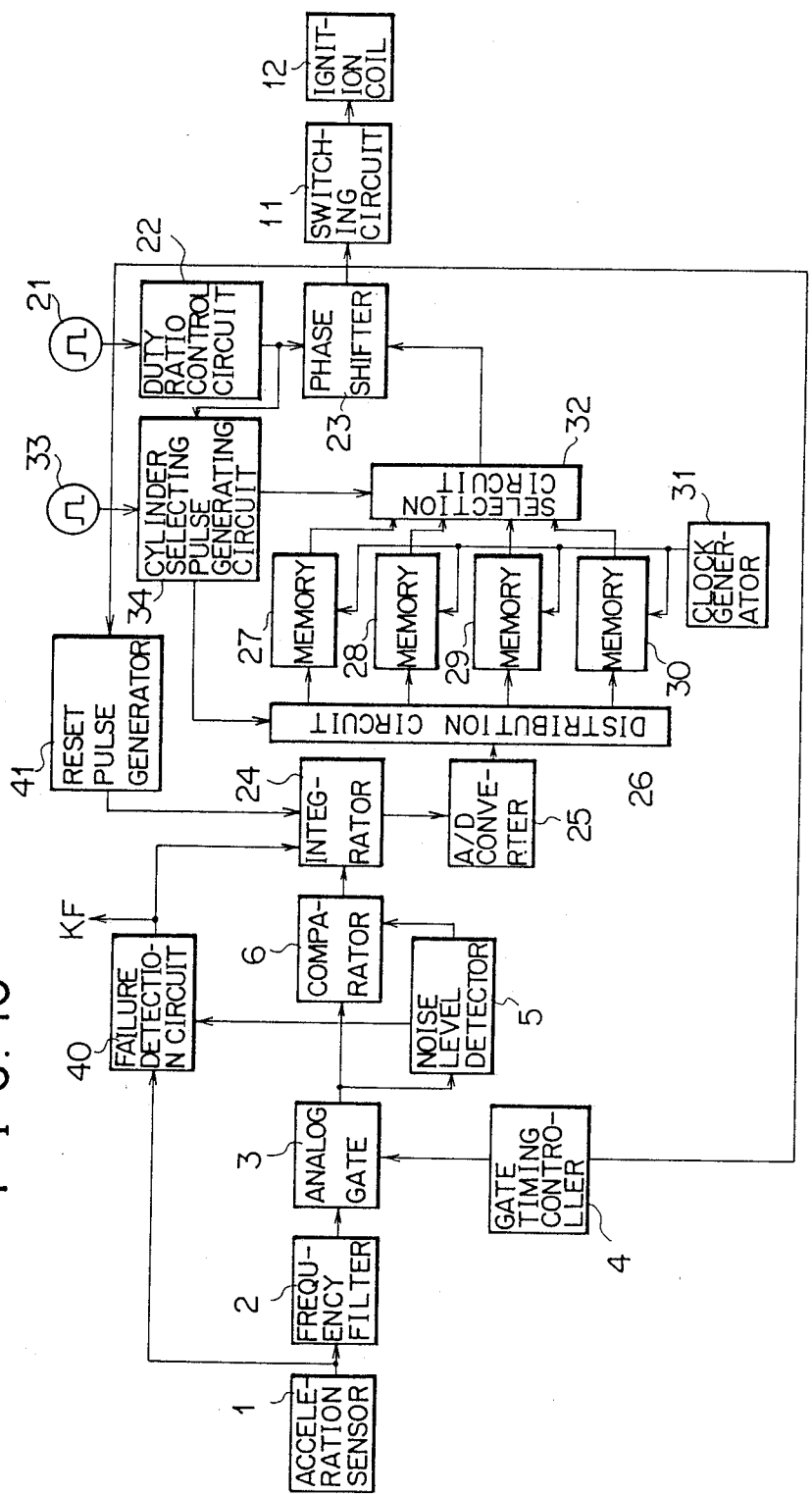
FIG. 10 is a block diagram of one embodiment of the invention to achieve the second objective.

FIG. 10 shows the block diagram of one embodiment that realizes the above concept. In the figure, components are identical with those of the conventional apparatus in FIG. 17 having like reference numbers, and their explanation will be omitted. Denoted 41 is a reset pulse generator which generates a reset pulse for every specified number of output signals of the phase shifter 23.

Figure 11:
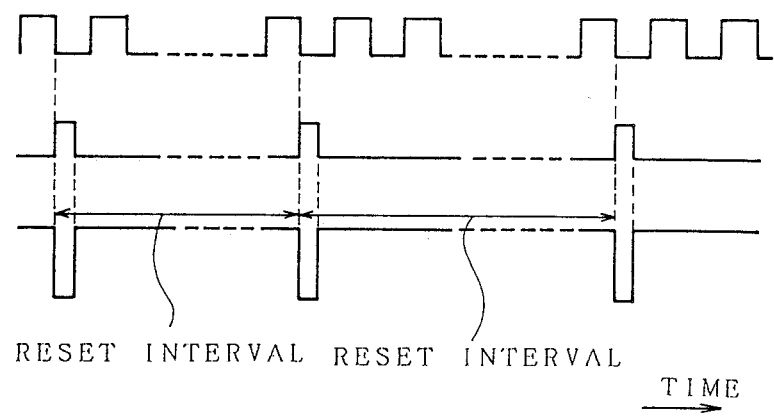
FIG. 11 is an operation waveform diagram for each circuit of FIG. 10.
Figure 14:
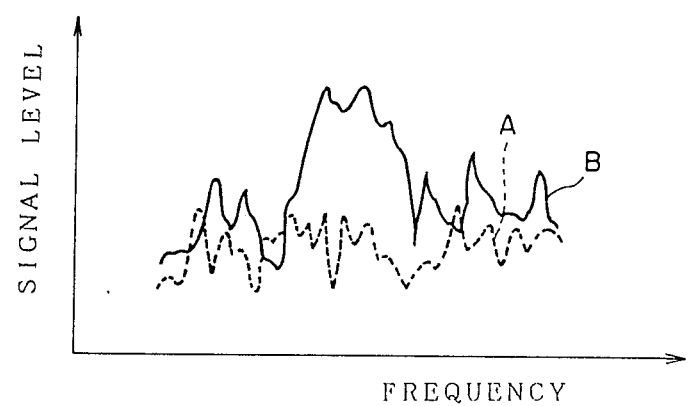
FIG. 14 is a frequency distribution characteristic of the acceleration sensor.

FIG. 11 shows operation waveforms of the components in FIG. 10. FIG. 11(g) represents the ignition pulses output from the phase shifter 23, and FIG. 11(j) represents the output of the reset pulse generator 41.

In FIG. 11, the ignition pulses (g) are counted and the reset pulse (j) is produced every specified number of ignition pulses to reset the integrator 24 each time the ignition has occurred a specified number of times.

As mentioned earlier, since the trace knocks to be controlled occur less frequently than do the transient knocks and no two or more knocks occur within the reset interval, the integrated voltage of the integrator 24 can be read for each knock detected in a manner similar to that of the conventional apparatus.

Figure 21:
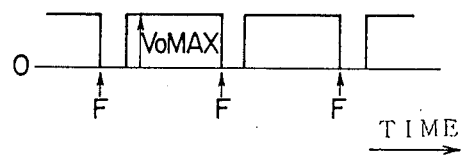
FIGS. 21 and 22 are operation waveform diagrams for the integrated voltage in the event of failure.
Figure 22:
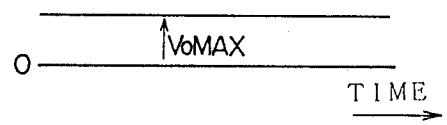

FIG. 11(k) represents the output of the failure detection circuit 40 which corresponds to FIG. 21, which was explained in connection with the conventional apparatus. The output of the failure detection circuit 40 is reset to zero each time the ignition has been performed a specified number of times, as in the case of resetting of the integrator 24.

While, in the foregoing embodiments, each time the ignition has taken place a specified number of times a reset pulse is generated repetitively so that the resetting is repeated at a certain period, resetting can also be done at more appropriate time in each region if finer variable control is carried out based on the revolution speed of the engine. Resetting in synchronism with the revolution period of the engine can be done by entering the output of the reference pulse generator 33 instead of the output of the phase shifter 23 into the reset pulse generator 41.

There is a probability that the interval of reset pulses generated by the reset pulse generator 41 is not appropriate for the ignition action or that the knock detection processing and the reset processing overlap in time. However, because the knocking produced in the engine is essentially trace knocks with small magnitudes, a failure to detect a single knock will not cause a serious trouble in engine. Therefore this probability poses no serious problem and needs no particular consideration.

As explained above, the embodiment of FIG. 10 has a simple construction in which the reset pulse generator 41 produces a reset pulse each time the ignition pulse from the phase shifter 23 is fed into the generator 41 a specified number of times. It is, however, probable that the resetting processing and the knock detection processing may overlap in the same time duration. Although the knock level is not high enough to cause a practical damage, this is still a problem that remains to be solved.

Figure 12:
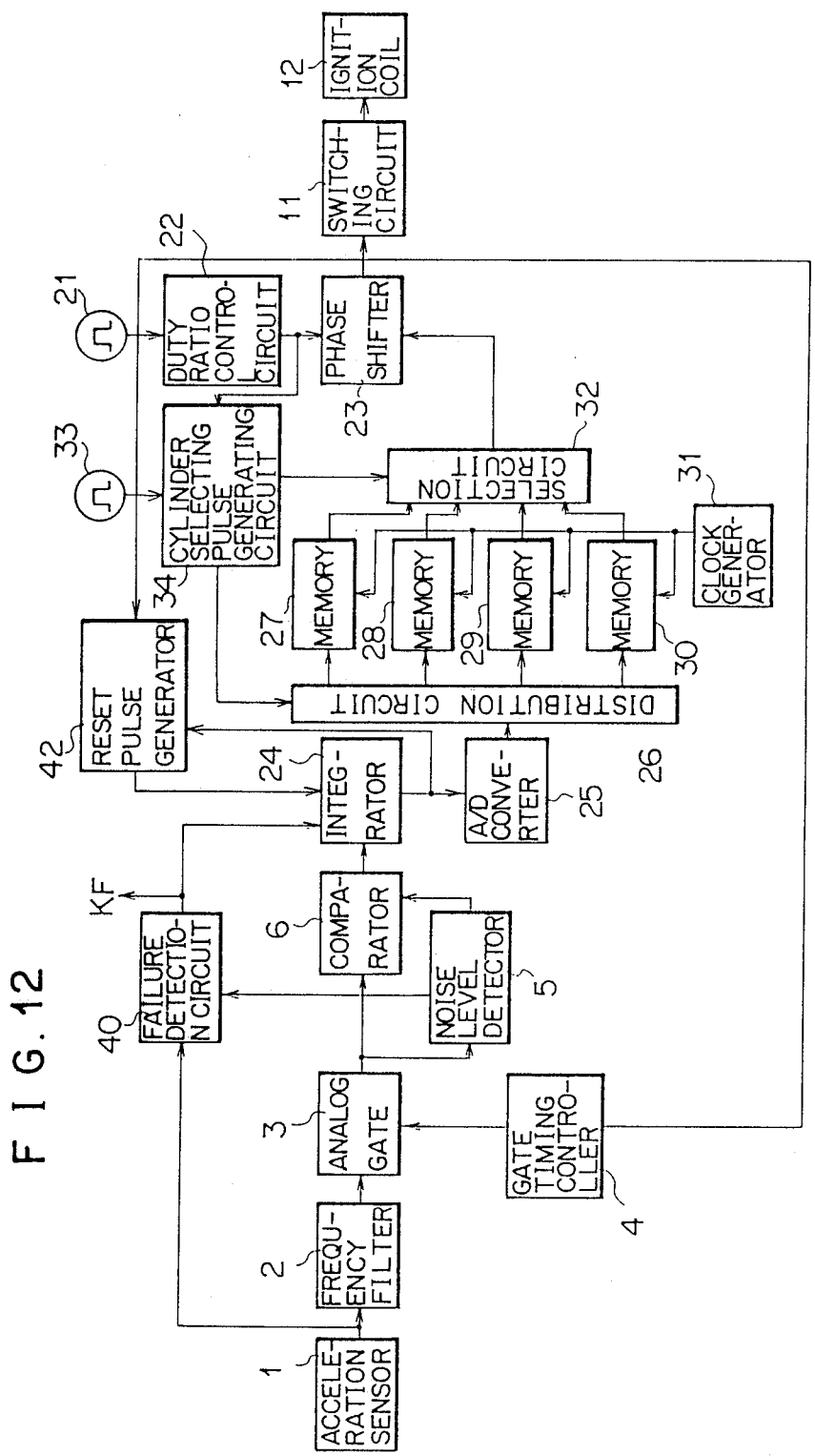
FIG. 12 is a block diagram of FIG. 10 partly modified as a further embodiment.

Another embodiment shown in FIG. 12 eliminates the problem of the preceding embodiment of FIG. 10. In the figure, designated 42 is a reset pulse generator, which, unlike the reset pulse generator 41, produces in synchronism with the ignition pulse from the phase shifter 23 a reset pulse output equivalent to the one in the conventional apparatus of FIG. 17 or in the embodiment of FIG. 10 only when the integrated voltage of the integrator 24 is output (i.e., only when the knock detection is made), thereby resetting the integrator 24 to force the integrated voltage output to zero.

It is obvious that the same result can be obtained if the output of the integrator 24 to be fed into the reset pulse generator 42 is replaced with the output of the A/D converter 25.

In summary, to achieve the second objective of this invention, this invention adds a new function to the conventional apparatus. That is, in an apparatus which comprises: a knock sensor to detect knock information in the engine; a knock discriminator to identify from the knock sensor output the knocking that occurs in each engine cylinder; an integrator which produces an integrated voltage according to the knock discriminator output and resets the integrated voltage to zero in response to the ignition action; an accumulator that accumulates the integrated voltage; a phase shifter which phase-controls the ignition signal according to the accumulator output; and a switching circuit that interrupts electric current to the ignition coil in response to the phase shifter output; a reset pulse generating circuit is added, which, according to the phase shifter output, resets the integrated voltage in synchronism with the ignition signal at intervals of more than a specified number of times the ignition cycle, so that the integrator which identifies the knock signals and outputs the integrated voltage is reset at intervals longer than the ignition cycle. As a result, even in the high engine revolution range, the reset period does not affect the knock detection, permitting as reliable a detection of knocks as during the low revolution operation. This system is particularly effective when a multi-cylinder engine is running at high revolution speeds.

What is claimed is:

1. A knock control apparatus of ignition timing control type comprising:

a first detecting means for detecting mechanical vibrations in an internal combustion engine and outputting vibration signals including at least knocking phenomena and mechanical and ignition noise information in the engine;

a second detecting means for detecting a noise level of said vibration signals from said first detecting means so as to generate a reference voltage signal for sampling only said knocking phenomena;

a generating means for generating a reference revolution signal representative of drive conditions of the internal combustion engine; and a processing means for processing the vibration signals directly supplied from said first detecting means in accordance with the reference voltage signal from said second detecting means and the reference revolution signal from said generating means in order to produce ignition signals, said processing means comprising:

a comparing means for comparing the output voltage from said first detecting means and the output voltage from said second detecting means to produce a knock detection pulse;

an integrating means for receiving said knock detection pulse from said comparing means and integrating said knock detection pulse to produce an integrated voltage; and a phase shifting means for retarding the ignition timing in accordance with the output voltage from said integrating means; characterized in that said processing means further comprises a knock control level increasing means for analyzing the knock detection pulse from said comparing means, so that, when the knock interval is short, the output characteristic of said integrating means is increased so as to augment the control level for suppressing the knock generating element, and is invalidated when the condition of the internal combustion engine reaches the normal operating state.

2. A knock control apparatus as set forth in claim 1, wherein the knock control level increasing means consists of a knock interval detection means that analyzes the operating condition of the internal combustion engine from the knock interval and determines whether or not the engine is running in the transient condition.

3. knock control apparatus as set forth in claim 2, wherein said knock control level increasing means further comprises a pulse generating means which, according to the output of the knock interval detection means, produces pulses of a specified width to activate the integrating means for a predetermined period of time.

4. A knock control apparatus of ignition timing control type comprising:
- a first detecting means for detecting mechanical vibrations in an internal combustion engine for each cylinder and outputting vibration signals including at least knocking phenomena and mechanical and ignition noise information in the engine;
- a second detecting means for detecting a noise level of said vibration signals from said first detecting means so as to generate a reference voltage signal for sampling only said knocking phenomena;
- a cylinder pulse generating means to generate a cylinder pulse corresponding to the ignition action in each cylinder of the engine;
- a duty ratio control circuit means to receive the cylinder pulse and output a duty ratio-controlled ignition pulse to secure a predetermined time duration for energizing the ignition coil; and
- a processing means for processing the vibration signals directly supplied from said first detecting means in accordance with the reference voltage signal from said second detecting means and the output signal for each cylinder from said duty ratio control circuit means in order to produce an ignition signal for each cylinder, said processing means comprising:
  - a comparing means for comparing the output voltage from said first detecting means and the output voltage from said second detecting means to produce a knock detecting pulse for each cylinder;
  - an integrating means for receiving said knock detection pulse from said comparing means and integrating said knock detection pulse to produce an integrated voltage;
  - an A/D converting means to convert the integrated voltage from said integrating means into a digital signal and output said digital signal;
  - a selecting means to select for each of the cylinders to be processed the output voltage from said A/D converting means; and
  - a phase shifting means to retard the ignition timing for each knocking cylinder according to the output of said selecting means;
  - said cylinder selecting means consisting at least of:
    - a cylinder selection pulse generation circuit to generate a cylinder selection pulse that selects a predetermined cylinder;
    - a distributor circuit to distribute the outputs of the A/D converting means among the cylinders selected by said cylinder selection pulse generation circuit;
    - a plurality of memories to store digital signals for each cylinder fed from said distributor circuit; and
    - a selection circuit to select one of said memories according to said cylinder selection pulse and output the data contained therein which corresponds to the fired cylinder;
  - whereby the integrated voltage is reset to zero at the ignition period according to the output of said phase shifter means.

5. A knock control apparatus as set forth in claim 4, further comprising:
- a failure detection circuit which receives the outputs from said first detecting means and said second detecting means to detect open wires and abnormal voltages and sends a fail signal to said integrating means and other devices.

6. A knock control apparatus as set forth in claim 5, wherein said knock control level increasing means is a knock interval detecting means which analyzes the operating condition of the internal combustion engine from the interval of the knocking pulses and determines whether or not the engine is running in the transient condition.

7. A knock control apparatus as set forth in claim 6, wherein said knock control level increasing means further comprises a pulse generating means which, according to the output of said knock interval detecting means, produces an output pulse of a predetermined width to activate said integrating means for a predetermined period of time.

8. A knock control apparatus as set forth in claim 6, wherein said knock control level increasing means further comprises: a control level correction signal generating means to receive the output from said knock interval detecting means and output a correction signal for increasing the control level; and an adder means to add said correction signal to the integrated voltage from said integrating means.

9. A knock control apparatus as set forth in claim 5, herein said knock control level increasing means is a knock interval detecting means provided between said distributor circuit and each of said memories, which increases the detected quantities of transient knocks and enters them to the corresponding memories.

10. A knock control apparatus of ignition timing control type comprising:
- a first detecting means for detecting mechanical vibrations in an internal combustion engine for each cylinder and outputting vibration signals including at least knocking phenomena and mechanical and ignition noise information in the engine;
- a second detecting means for detecting a noise level of said vibration signals from said first detecting means so as to generate a reference voltage signal for sampling only said knocking phenomena;

a cylinder pulse generating means to generate a cylinder pulse corresponding to the ignition action in each cylinder of the engine;

a duty ratio control circuit means to receive the cylinder pulse and output a duty ratio-controlled ignition pulse to secure a predetermined time duration for energizing the ignition coil; and a processing means for processing the vibration signals directly supplied from said first detecting means in accordance with the reference voltage signal from said second detecting means and the output signal for each cylinder from said duty ratio control circuit means in order to produce an ignition signal for each cylinder, said processing means comprising:

a comparing means for comparing the output voltage from said first detecting means and the output voltage from said second detecting means to produce a knock detecting pulse for each cylinder;

an integrating means for receiving said knock detection pulse from said comparing means and integrating said knock detection pulse to produce an integrated voltage;

a knock control level increasing means for analyzing the knock detection pulse from said comparing means, so that, when the knock interval is short, the output characteristic of said integrating means is increased so as to augment the control level for suppressing the knock generating element, and is invalidated when the condition of the engine reaches the formal operating state;

an A/D converting means to convert the integrated voltage from said integrating means into a digital signal and output said digital signal;

a selecting means to select for each of the cylinders to be processed the output voltage from said A/D converting means; and a phase shifting means to retard the ignition timing for each knocking cylinder according to the output of said selecting means;

said cylinder selecting means consisting at least of:

a cylinder selection pulse generation circuit to generate a cylinder selection pulse that selects a predetermined cylinder;

a distributor circuit to distribute the outputs of the A/D converting means among the cylinders selected by said cylinder selection pulse generation circuit;

a plurality of memories to store digital signals for each cylinder fed from said distributor circuit;

a selection circuit to select one of said memories according to said cylinder selection pulse and output the data contained therein which corresponds to the fired cylinder; and a reset pulse generation circuit to produce, according to the output of said phase shifting means, an integrated voltage; characterized in that said reset pulse generation circuit resets said integrated voltage to zero at the interval of more than a predetermined number of times the ignition cycle and in synchronism with the ignition signal.

11. A knock control apparatus as set forth in claim 10, wherein said reset pulse generation circuit is synchronized with the ignition pulse output from said phase shifting means only when said integrator means outputs the integrated voltage.

12. A knock control apparatus as set forth in claim 11, wherein said reset pulse generation circuit is synchronized with the ignition pulse output from said phase shifting means only when the A/D converting means produces its output.

* * * * *